United States Patent
Hsu

(10) Patent No.: US 6,363,319 B1
(45) Date of Patent: Mar. 26, 2002

(54) CONSTRAINT-BASED ROUTE SELECTION USING BIASED COST

(75) Inventor: Ivy P. Hsu, Danville, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/387,036

(22) Filed: Aug. 31, 1999

(51) Int. Cl.[7] .................................................. G06F 7/00
(52) U.S. Cl. ........................ 701/202; 370/238; 370/351; 709/241
(58) Field of Search ................................ 701/202, 209; 370/235, 238, 351; 709/238, 241

(56) References Cited

U.S. PATENT DOCUMENTS 5,870,564 A * 2/1999 Jensen et al. ................ 709/238
6,016,306 A * 1/2000 Le Boudec et al. ......... 370/235

OTHER PUBLICATIONS

Bruce Davis, Yakov Rekhter, Eric Rosen, Arun Viswanathan, Vijay Srinivasan, Steven Blake, Use of Label Switching With RSVP, Mar. 1998, Ten (10) pages, Network Working Group.

Bilel Jamoussi, Constraint–Based LSP Setup using LDP, Feb. 1999, Twenty–nine (29) pages, MPLS Working Group.

Eric C. Rosen, Arun Viswanathan, Ross Callon, Multiprotocol Label Switching Architecture, Apr. 1999, Forty–three (43) pages, Network Working Group.

Davie, Lawrence, McCloghrie, Rekhter, Rosen, Swallow, Doolan, MPLS using LDP and ATM vc Switching, Apr. 1999, Thriteen (13) pages, Network Working Group.

Ooms, Livens, Sales, Ramalho, Acharya, Griffoul, Ansari, Framework for IP Multicast in MPLS, Jun. 1999, Twenty–three (23) pages, MPLS Working Group.

Callon, Feldman, Fredette, Swallow, Viswanathan, A Framework for Multiprotocol Label Switching, Jun. 1999, Fifty–six (56) pages, Network Working Group.

Awduche, Malcolm, Agogbua, O'Dell, McManus, Requirements for Traffic Engineering Over MPLS, Jun. 1999, Internet Engineering Task Force.

Andersson, Doolan, Feldman, Fredette, Thomas, LDP Specification, Jun. 1999, Eighty–four (84) pages, Network Working Group.

* cited by examiner

Primary Examiner—William A. Cuchlinski, Jr.
Assistant Examiner—Ed Pipala
(74) Attorney, Agent, or Firm—Blakely Sokoloff Taylor & Zafman LLP

(57) ABSTRACT

The present invention is a method and apparatus for selecting a route for a flow from a plurality of network paths connecting a source to a destination. The method comprises: (a) determining cumulative costs for a plurality of candidate paths from the network paths using a cost bias which is dynamically calculated based on at least one of a flow attribute and a path attribute; and (b) selecting an optimal path having a minimum of the cumulative costs. The optimal path corresponds to the selected route.

48 Claims, 14 Drawing Sheets

CONSTRAINT-BASED ROUTE SELECTION USING BIASED COST

BACKGROUND

1. Field of the Invention

This invention relates to computer networks. In particular, the invention relates to route selection.

2. Description of Related Art

One common approach in route selection with bandwidth requirement is to modify the well-known Dijkstra technique so that only links that meet the bandwidth requirement are considered in the Dijkstra procedure. The result is a minimum-cost route over links that can meet the bandwidth requirement.

For example, in a packet forwarding known as Multiprotocol Label Switching (MPLS), to accommodate label switched paths (LSPs) of different priorities, the routing selector may first apply the modified Dijkstra technique based on a given LSP's bandwidth demand. If a feasible path is not found, the route selector may preempt an existing LSP of lower priority from a congested link in order to re-allocate the bandwidth to the new LSP. A pre-empted LSP will have to be re-established on an alternative route.

This approach has a number of shortcomings. First, it is difficult to make an intelligent decision of which LSP to preempt. The traditional technique is to consider all candidate LSPs on all possible links, evaluate the impact of preempting, and select the LSP that has the minimum cost impact. This is computational expensive and is not practically feasible for large networks. Second, if the preempting is made randomly, a preempted LSP may fail to be re-routed, resulting in loss of connection. Third, the approach disrupts the LSP's traffic and degrades service quality due to effort in pre-empting and re-routing. Last, the approach may lead to traffic congestion because some high priority LSPs may be placed on very long routes.

Therefore there is a need in the technology to provide a simple and efficient method to select routes in a system of networks.

SUMMARY

The present invention is a method and apparatus for selecting a route for a flow from a plurality of network paths. Cumulative costs for a plurality of candidate paths from the network paths are determined using a cost bias which is dynamically calculated based on at least one of a flow attribute and a path attribute. An optimal path is then selected which has a minimum of the cumulative costs. The optimal path corresponds to the selected route.

According to one embodiment of the present invention, the flow attribute includes a flow priority and a bandwidth demand, and the path attribute includes a link bandwidth and a maximum available link bandwidth. The cumulative cost for a candidate node in a candidate path includes a current cumulative cost and a biased static cost. The biased static cost includes a static cost of the link biased by a bias value. The bias value is a function of the flow priority, the bandwidth demand, the link bandwidth, and the maximum available link bandwidth.

The advantages of the present invention include increased traffic efficiency by taking into account bandwidth and traffic requirements in route selection.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DESCRIPTION

Figure 1A:
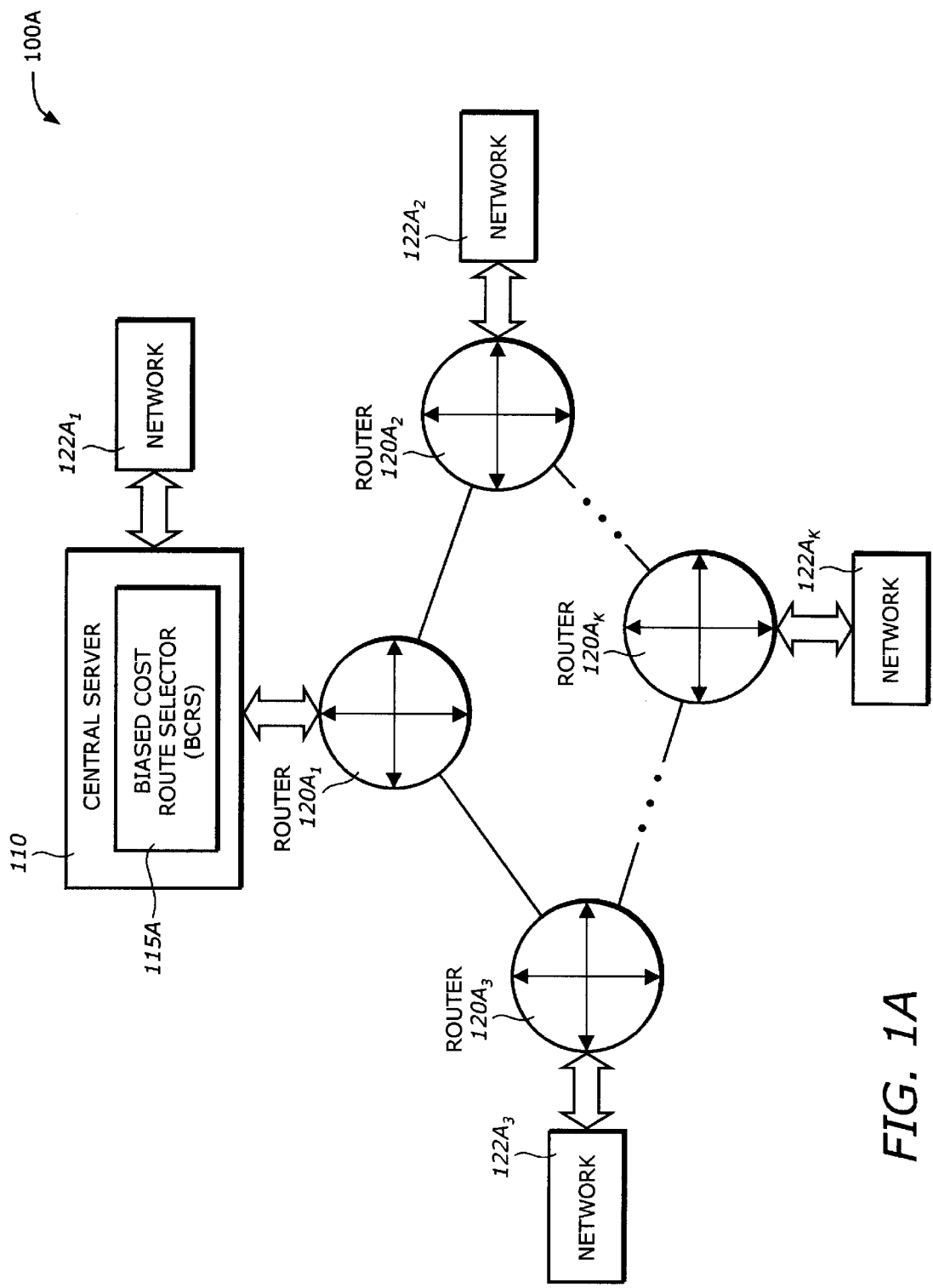
FIG. 1A is a diagram illustrating a system having a central server with a biased cost route selector in which one embodiment of the invention can be practiced.

The present invention relates to a method and apparatus for selecting routes in computer communication networks. The technique determines cumulative costs of candidate paths using a biased cost function and selects the optimal path based on the minimum cumulative costs. The biased cost function allows the selection be made intelligently and dynamically to accommodate the traffic requirements and bandwidth availability.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

The present invention is a constraint-based route selection technique that supports establishing Multi-protocol Label Switching (MPLS) label switched paths through explicit routing. The invention relates to applications where the constraints associated with a flow include a bandwidth requirement and a priority. The bandwidth requirement provides that a flow should be routed along a path with sufficient available bandwidth on each link. The priority attribute differentiates flows by the relative likelihood of being blocked by the network due to insufficient resources, so that flows of the higher priority class should expect higher service availability.

The present invention introduces a number of modifications and improvements to the standard Dijkstra calculation to accommodate these two constraints. The bandwidth requirement is met by considering only links with sufficient bandwidths in the iterative procedure within Dijkstra. In determining the cumulative cost of each potential route, the technique calculates a cost bias factor for each link, which is a function of the link's bandwidth availability and the priority and bandwidth of the given flow. Thus, the cost of a link is the product of its static cost from link state advertisements and this bias factor. The technique selects a route with sufficient bandwidth that minimizes the cumulative biased cost.

The objective of the bias factor is to make highly congested links less desirable for new flows. Furthermore, this sensitivity to link congestion is greater for lower priority classes, so that low priority flows with less costly alternate paths will avoid these congested links, leaving the remaining bandwidths for high priority flows. The intent is to keep high priority flows on their direct paths and place low priority flows on longer alternate paths if necessary. Thus, this technique is referred to as a multi-class technique using cost bias.

The route selection process can be implemented either centrally in a network server or distributedly on each label edge router (LER). The technique is designed to be simple enough to be implementable on routers and retains the same order of complexity as the standard Dijkstra technique.

FIG. 1A is a diagram illustrating a system 100A having a central server with a biased cost route selector in which one embodiment of the invention can be practiced. The system 100A includes a central server 110, routers $120A_1$ to $120A_k$, and networks $122A_1$ to $122A_k$. The central server 110 includes a biased cost route selector 115A.

The central server 110 acts as a centralized server for the entire system of networks. The central server 110 forwards the route decision to each of the routers $120A_1$ to $120A_k$. The biased cost route selector 115A provides the central server 110 the route selection decisions.

The routers $120A_1$ to $120A_k$ provides connectivity among the networks $122A_1$ to $122A_k$. The networks $122A_1$ to $122A_k$ are any computer networks that provide network communications.

Figure 1B:
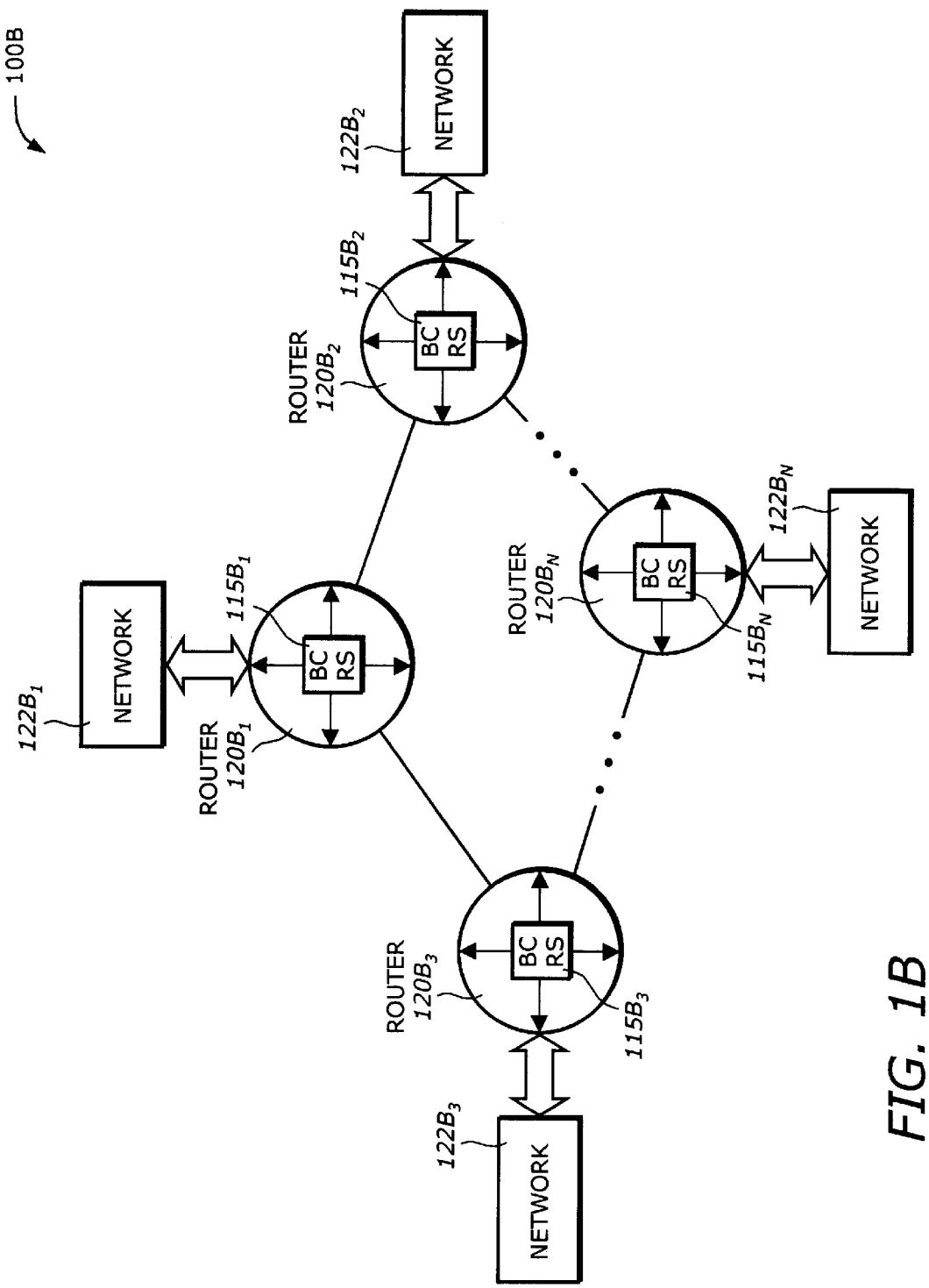
FIG. 1B is a diagram illustrating a system with local biased cost route selectors in which one embodiment of the invention can be practiced.

FIG. 1B is a diagram illustrating a system 100B with local biased cost route selectors in which one embodiment of the invention can be practiced. The system 100B includes routers $120B_i$ and networks $122B_i$, where i=1, . . . , N.

The routers $120B_i$ route the traffic flows in the system to the associated networks $122B_i$. Each of the routers 120Bi has a biased coast route selector (BCRS) $115B_i$. The BCRS $115B_i$ selects the routes based on an optimal biased cost metric as will be explained later. In this system, the BCRS $115B_i$ performs route selection in a distributed manner.

Figure 1C:
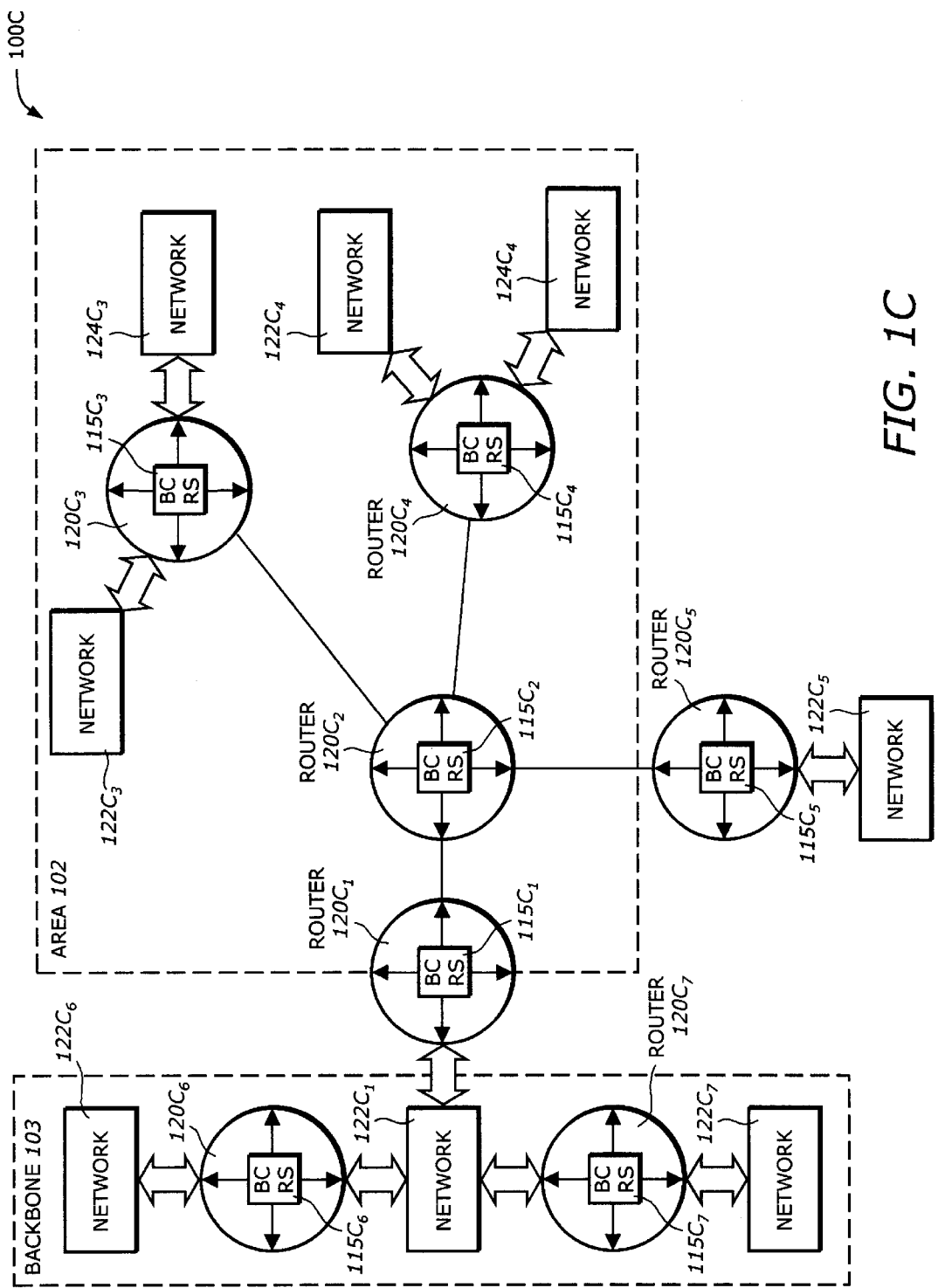
FIG. 1C is a diagram illustrating a system with inter-area routing in which one embodiment of the invention can be practiced.

FIG. 1C is a diagram illustrating a system 100C with inter-area routing in which one embodiment of the invention can be practiced. The system 100C includes an area 102 and a backbone 103.

The area 102 includes routers $120C_1$, $120C_2$, $120C_3$, $120C_4$, and $120C_5$. The routers $120C_1$, $120C_2$, $120C_3$, $120C_4$, and $120C_5$ are coupled to the networks $122C_1$, $122C_2$, $122C_3$, $122C_4$, and $122C_5$, respectively, The backbone 103 includes routers $120C_6$ and $120C_7$ coupled to networks $122C_6$ and $122C_7$, respectively. Each of the routers has a biased cost route selector. The router $120C_1$ is an area router as well as a backbone router. It advertises the summary information about the networks in the area 102 into the backbone 103 and vice versa. Suppose the summary LSAs are extended to also advertise available bandwidths to destination networks, then whenever the bandwidth availabilities on the point-to-point links from router $120C_2$ to routers $120C_3$ and $120C_4$ change significantly, the router $120C_1$ re-calculates the available bandwidths to the networks $122C_3$, $122C_4$, and $124C_4$ and re-transmit summary LSAs into the backbone area 103.

Figure 1D:
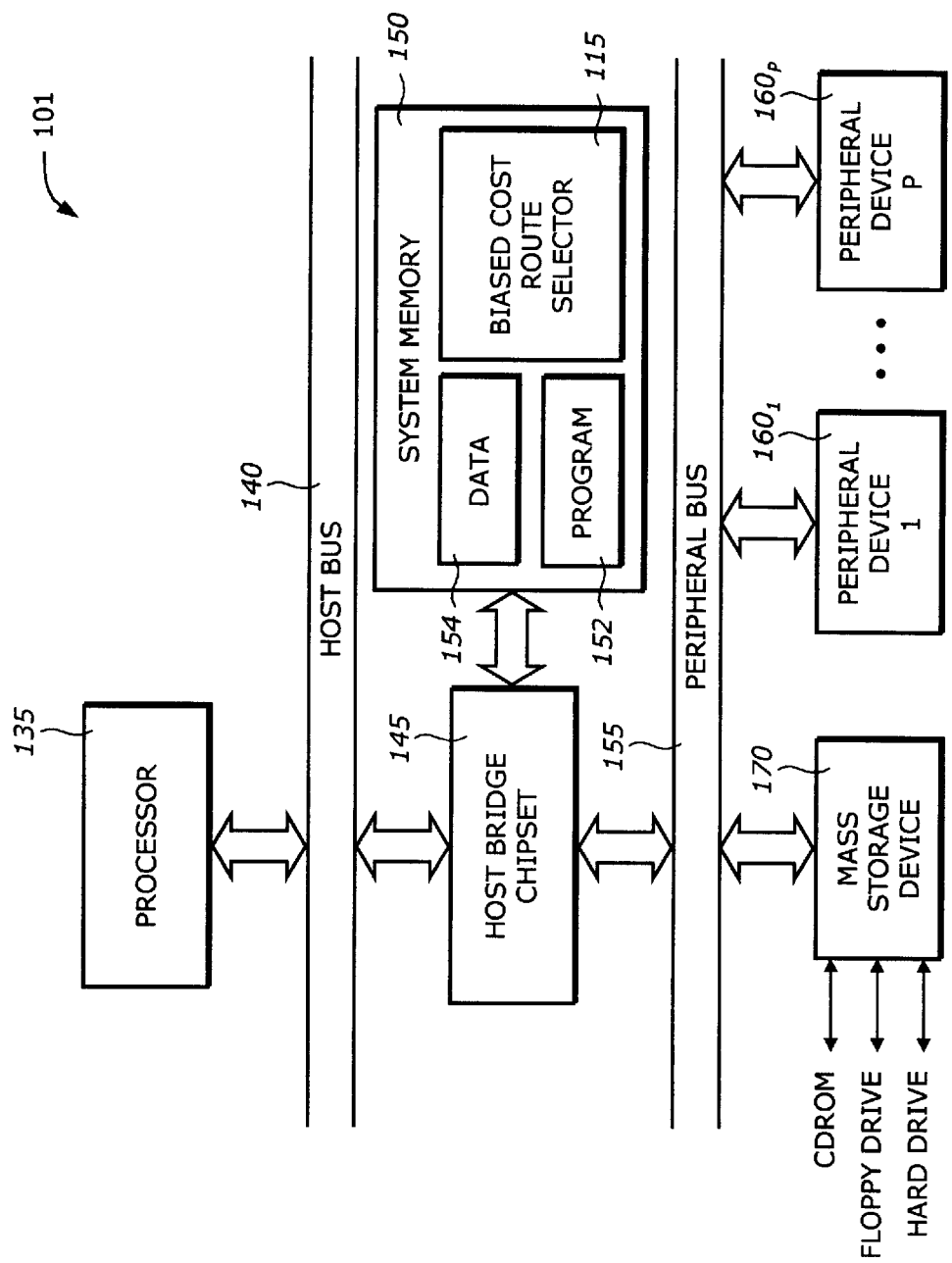
FIG. 1D is a diagram illustrating a computer system in which one embodiment of the invention can be practiced.

FIG. 1D is a diagram illustrating a computer system 101 in which one embodiment of the invention can be practiced. The computer system 101 includes a processor 135, a host bus 140, a host bridge chipset 145, a system memory 150, a PCI bus 155, "K" PCI devices $160_1$ to $160_K$, and a mass storage device 170.

The processor 135 represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 145 includes a number of interface circuits to allow the host processor 135 access to the system memory 150, and the peripheral bus 155. The system memory 150 represents one or more mechanisms for storing information. For example, the system memory 150 may include non-volatile or volatile memories. Examples of these memories include flash memory, read only memory (ROM), or random access memory (RAM). The system memory 150 includes a biased cost route selector 115, a program 152, and data 154. The program 152 may contain other traffic management programs such as hop-by-hop selector, MPLS process, LDP label management, and others. The data 154 may contain databases such as resource attribute, link state, other routing protocol databases, and others. Of course, the system memory 150 preferably contains additional software (not shown), which is not necessary to understanding the invention.

The peripheral slots $160_1$ to $160_K$ provide interfaces to peripheral devices. Examples of peripheral devices include a network interface and a media interface. The network interface connects to communication channel such as the Internet. The Internet provides access to on-line service providers, Web browsers, and other network channels. The media interface provides access to audio and video devices. The mass storage device 170 includes compact disk read only memory (CD ROM), floppy diskettes, and hard drives.

When implemented in software, the elements of the present invention are essentially the code segments to perform the necessary tasks. The program or code segments can be stored in a processor readable medium or transmitted by a computer data signal embodied in a carrier wave over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 2:
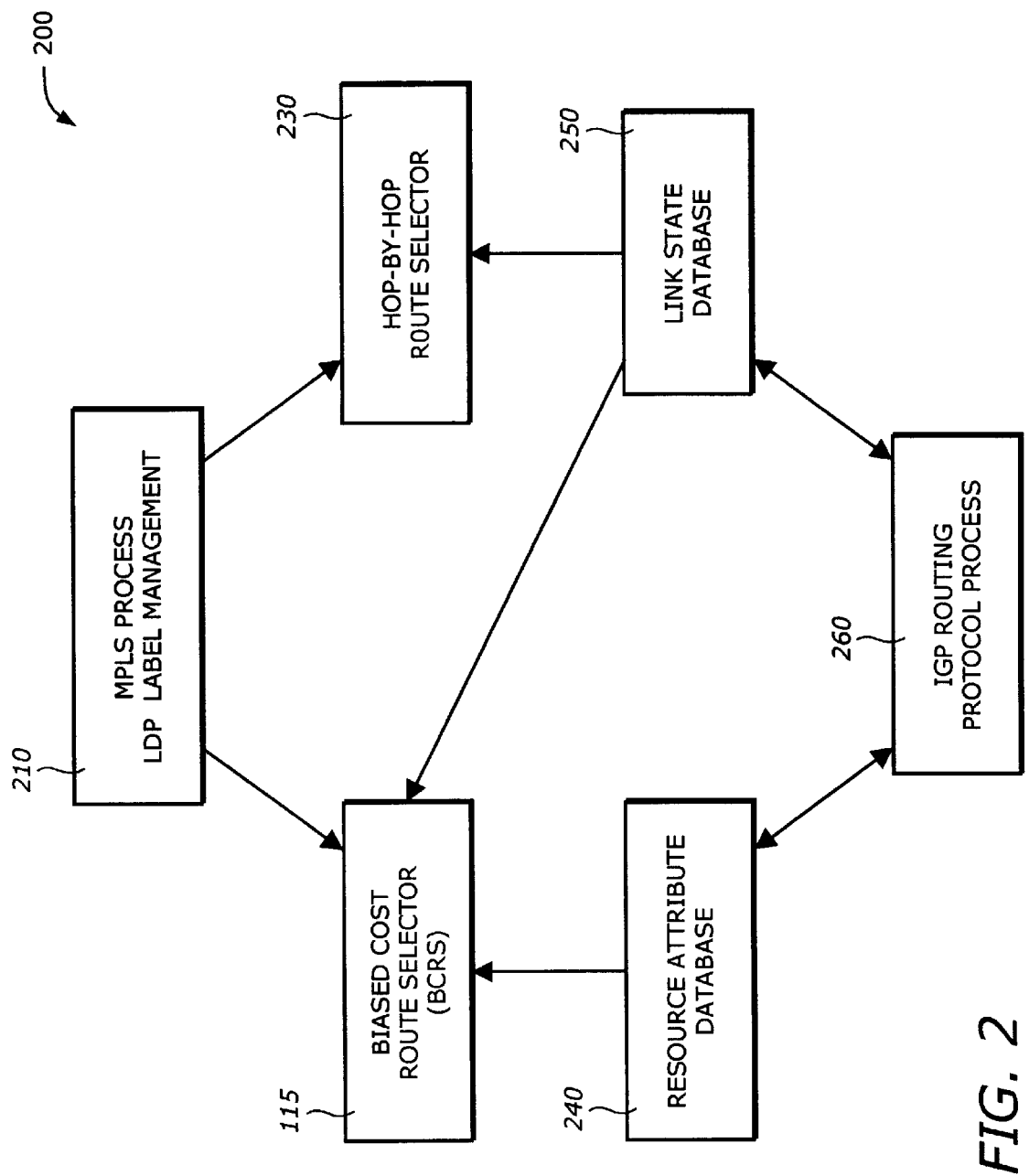
FIG. 2 is a diagram illustrating a typical router according to one embodiment of the invention.

FIG. 2 is a diagram illustrating a typical router 200 according to one embodiment of the invention. The router 200 includes a multi-protocol label switching (MPLS) process 210, a biased cost route selector (BCRS) 115, a hop-by-hop route selector 230, a resource attribute database 240, a link state database 250, and an interior gateway protocol (IGP) routing protocol process 260.

The MPLS process 210 handles the label distribution protocol (LDP), label management, and Forward Equivalence Class (FEC) mapping, etc. The BCRS 115 is shown in FIG. 1D and represents the BCRS 115A, 115B$_i$, and 115C$_i$ as shown in FIGS. 1A, 1B, and 1C, respectively. The BCRS 115 selects the routes to be provided to the MPLS process 210 using a dynamically calculated cost bias function. The hop-by-hop route selector 230 maintains the forwarding table and supports the set-up of best effort LDPs. The resource attribute database 240 and the link state database 250 store advertisements provided by the IGP routing process 260.

Figure 3:
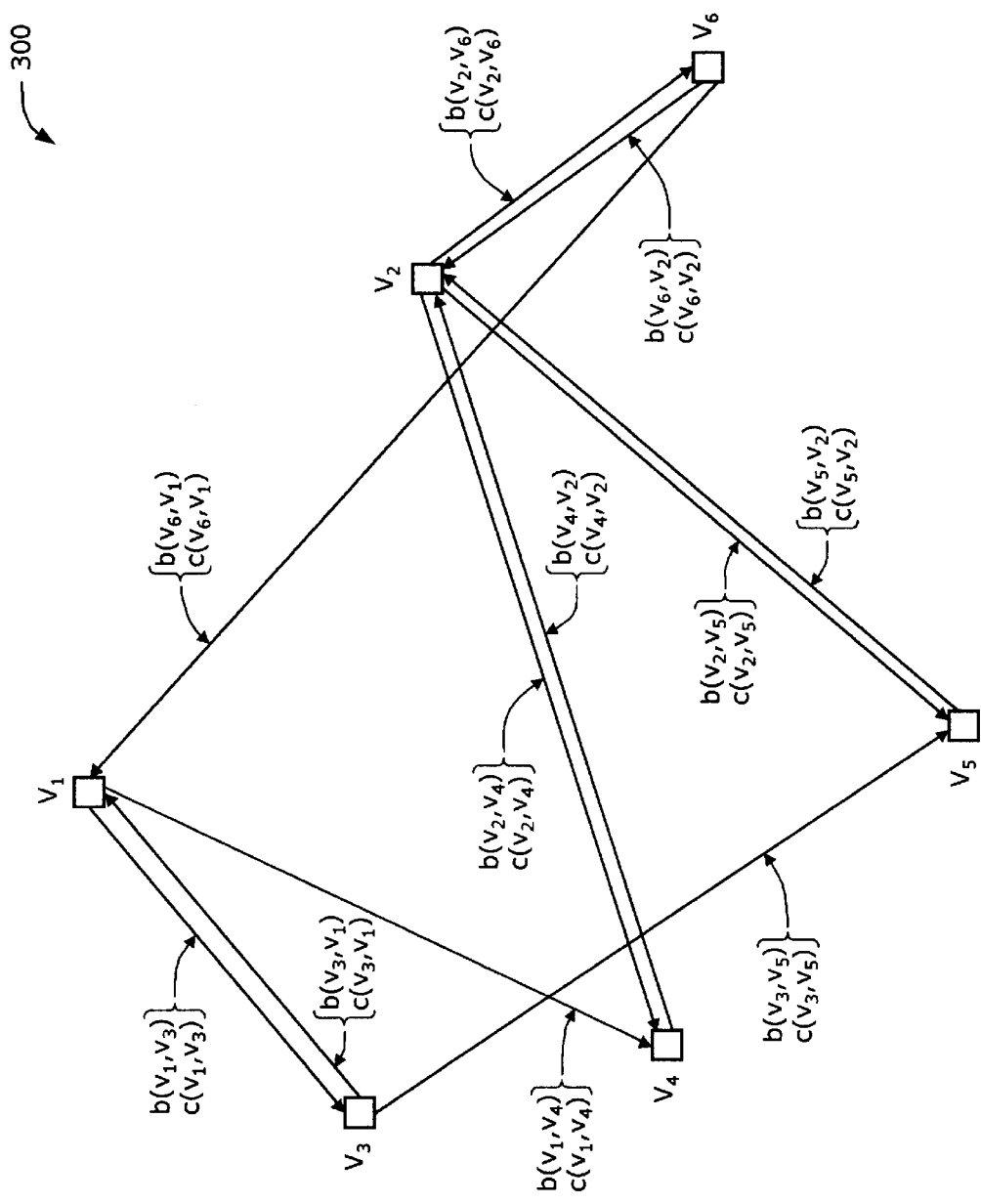
FIG. 3 is a diagram illustrating a graph representing a network topology according to one embodiment of the invention.

FIG. 3 is a diagram illustrating a graph 300 representing a network topology according to one embodiment of the invention.

The network topology is represented by a directed graph (V,E). V represents the set of vertices, which include both routers and transit networks (i.e., non-stub networks), and E is the set of unidirectional links. If vertices v and w belong to V and are directly connected, (v,w) represents the connectivity from v to w and (w,v) represents that from w to v. Thus (v,w) and (w,v)∈E.

The two directions are treated independently because MPLS flows are unidirectional. Hence the two directions of a link may be associated with different available bandwidths. Define b(v, w) as the current available bandwidth on link (v,w). This corresponds to the bandwidth that may be reserved by future constraint-based routed label switched paths (CR-LSPs) with explicit bandwidth requirements indicated in the traffic parameters time-length-value (TLV).

Also associated with each link (v,w) is a cost metric c(v,w), which represents the metric advertised in the Open Shortest Path First (OSPF) Router-LSA for that link. The OSPF is an intra-domain routing protocol recommended for Internet. Note that the cost of a router link should always be 1 or greater, while the cost of a link from a transit network to a router should always be 0. The Dijkstra technique employed by OSPF chooses the path to each destination based on the cumulated cost to that destination. Therefore, if a network has all router links of cost 1, the cost metric becomes equivalent to hop count and the least-cost path is simply the shortest-hop path.

Each router in the network maintains an image of the topology (V,E) and c(v,w) for all (v,w)∈ E through standard OSPF link state advertisements. QoS extensions provide advertisements of b(v,w) for all (v,w)∈ E Note that in general, dynamic events such as link additions, outages, and changes in available bandwidths propagate throughout the network after some finite delay, so that at any time the topology information may be out of date.

In the exemplary graph of FIG. 3:
V={v1, v2, v3, v4, v5, v6}
E={(v1, v3), (v3, v1), (v1, v4), (v2, v4), (v4, v2), (v3, v5), (v2, v5), (v5, v2), (v2, v6), (v6, v2), (v6, v1)}

The links (v1, v3), (v3, v1), (v1, v4), (v2, v4), (v4, v2), (v3, v5), (v2, v5), (v5, v2), (v2, v6), (v6, v2), and (v6, v1) have the current available bandwidths b(v1, v3), b(v3, v1), b(v1, v4), b(v2, v4), b(v4, v2), b(v3, v5), b(v2, v5), b(v5, v2), b(v2, v6), b(v6, v2), and b(v6, v1), and cost metrics c(v1, v3), c(v3, v1), c(v1, v4), c(v2, v4), c(v4, v2), c(v3, v5), c(v2, v5), c(v5, v2), c(v2, v6), c(v6, v2), and c(v6, v1), respectively.

BIASED COST ROUTE SELECTION

The objective of the route selection is to find a feasible explicit path for a CR-LSP from source s to destination d with a bandwidth requirement B. The CR-LSP has an associated priority m∈M. A numerically smaller m represents a higher priority.

m corresponds to the Setup Priority which represents the LSP's availability attribute. That is, the likelihood of the LSP being rejected due to lack of resources should be lower for lower m. In addition, the Holding Priority in MPLS represents an LSP's resilience attribute in being preempted. It is defined such that LSPs with high availability always have high resilience, while LSPs with low availability can also be promoted to have higher resilience. The route placement takes the Setup Priority m into account. It does not explicitly use the Holding Priority. Furthermore, the routing priority may or may not be associated with any service scheduling priority (as in Differentiated Services).

The biased cost route selector introduces a cost bias to the static OSPF cost metric c(v,w) associated with link (v,w). This cost bias is calculated dynamically by the route selection process handling the given flow (at either the ingress LER or a centralized server). Again, note that this is different from having each router calculate dynamic cost metrics for its outgoing links and advertising them in the OSPF link state advertisements.

There are a number of advantages to this approach: (1) since hop-by-hop routing is still based on the advertised cost metrics, the biased cost route selection technique leaves the hop-by-hop routing system intact; and (2) the cost bias in this case can depend on not only the current state of the link resource, b(v,w), but also the characteristics of the flow to be placed (i.e., its bandwidth demand Band priority m).

Furthermore, define $b_{max}$=max b(c, w) for all (v,w) in E, $b_{max}$ is the maximum available link bandwidth in the network at the current state. It is used to obtain a normalized link availability (=b(v, w)/$b_{max}$). This normalized link availability is used instead of each link's own relative availability (=b(v, w)/physical capacity) for a number of reasons: (1) It better reflects availability in network with different physical link speeds, e.g., a new OC-3 has a greater availability than a new DS-3. (2) A link's physical capacity may not be advertised in the QoS LSAs. (3) The ratio tracks the relative utilization of links as network loading evolves.

The cost bias for link (v,w) is therefore denoted as $p(m,B,b(v,w)b_{max})$ to indicate its dependence on these four parameters. The biased cost route selector modifies the shortest-widest feasible path algorithm by replacing the static cost c(v, w)used in the Dijkstra process by a biased cost $c(v,w)*p(m,B,b(v,w), b_{max})$. In other words, it selects the path with the minimum cumulative biased cost $\Sigma$ c(v, w)*p(m,B,b(v,w), $b_{max}$) for all (v,w) belonging to r, subject to the feasibility constraint b(v,w)≧B, for all (v,w) belonging to r. The path bandwidth serves as a tie-breaker when there are more than one path with the same cumulative biased cost.

Denote
- v=vertex under consideration;
- S=the set of candidate vertices to be added to the spanning tree;
- L(x)=cumulative biased cost from source S to vertex x, and
- B(x)=path bandwidth from source s to vertex x.

The biased cost route selection can be performed in the following steps.

Step 1: Initialization
  Set v=s. s is the root of the spanning tree.
  Let L(v)=0 and B(v)=∞. L(x)=∞ and B(x)=0 for all other vertices.

Step 2: Update metrics and add candidates to the set S
  Perform the following updates for each vertex w that (1) is not already on the spanning tree, (2) has an edge (v, w) ∈E, and (3) has sufficient bandwidth b(v,w)≧B.

if L(w)<L(v)+c(v,w)*p(m, B, b(v,w), $b_{max}$), a lower cost feasible path from s to w is found through v. Update w by setting L(w)=L(v)+c(v,w)* p(m,B,b(v,w), $b_{max}$) and B(w)=min{B(v), b(v,w)} where m{x,y} is the operator to take the minimum of x and y. Add w to the candidate set S if necessary.

else if L(w)=L(v)+c(v,w)*p(m, B, b(v,w), $b_{max}$), but min{B(v), b(v,w)}>B(w), the path from s to w through v has an equal cost as the previous path but with a larger path bandwidth. Update B(w) and add w to S if necessary.

Step 3: Add the next least-cost vertex to the spanning tree
  Find the vertex w in S with the minimum L(w). Add w to the spanning tree and set v=w. This will be the vertex whose neighbors will be examined in the next iteration.
  Stop if v=the destination d.
  else, go back to step 2.

Handling Crankback

Explicit route selection is based on a snapshot of the link state database at the time of flow placement request, which may contain out-of-date information relative to the actual network states. There are two main causes for such inaccuracy: The first is the propagation delay in LSA flooding, which exists in any link-state routing system. In QoS routing, the inaccuracy is also caused by the fact that link resource availability is only updated when there is a significant change.

Unlike connectionless routing, which recovers from route changes with changes in routers' forwarding tables, a CR-LSP that encounters a (strictly routed) node with insufficient resources will be rejected with an "Resource Unavailable" error notification. The source router, therefore, must respond by selecting an alternative route. In the biased cost route selector, the selection should eliminate the link with insufficient resources from the link state database according to the error notification. It should then re-compute the algorithm based on this reduced graph to find an alternative route that would not include the link in question.

Impacts on Best-Effort Traffic

Most existing QoS routing solutions consider the bandwidth-guaranteed flows in isolation from the best-effort flows. Route placement for bandwidth-guaranteed flows is done either without regard to the impacts on the lower-priority best-effort traffic, or based on the assumption that the bandwidth resources in the network have been statically partitioned between the two types of traffic. We note that static partitioning in general is sub-optimal, as resource usages by the two types of traffic vary on different regions of the network, and cannot be easily predicted a priori. Furthermore, it is expected that best-effort flows will still constitute the majority of the traffic in the network. Thus as QoS flows consume bandwidth on certain links and receive priority treatments, they can cause congestion or even starvation for the best-effort traffic.

There are two potential solutions here: The first solution proposes a solution called virtual residual bandwidth, which modifies the advertised available bandwidth for bandwidth-guaranteed flows based on the best-effort traffic loading. In other words, the advertised available bandwidth can be reduced not only due to bandwidth commitments for CR-LSPs, but also to reflect the measured congestion for best-effort traffic.

The idea of OSPF Optimized Multipath (OMP) can be another potential solution. Instead of changing the available bandwidth to the guaranteed flows, this approach reduces the impact of guaranteed flows by load-balancing the best-effort traffic across multiple paths. It first relaxes the best path criterion of OSPF by not restricting the next hop(s) to be the ones with the minimum cost, so that more paths may be eligible between each source and destination pair. OMP relies on introducing Opaque LSAs to advertise an "equivalent load" metric, which is a function of link loading and packet loss. The best-effort traffic shares across the multiple next hops are then gradually adjusted as functions of the most critically loaded link along each path.

Such OMP technique can certainly coexist with the multi-class technique. A network can use the multi-class technique to route CR-LSPs with bandwidth requirements, and then use the OMP technique to load-balance best-effort flows over hop-by-hop routed LSPs. The bandwidth-guaranteed flows are routed without considering best-effort traffic, but OMP shifts best-effort traffic away from any congested link caused by guaranteed flows through OMP. In fact, since the multi-class algorithm strives to evenly spread bandwidth reservations in the network, the effect may be beneficial to best-effort traffic by allowing more usable paths in OMP.

Figure 4:
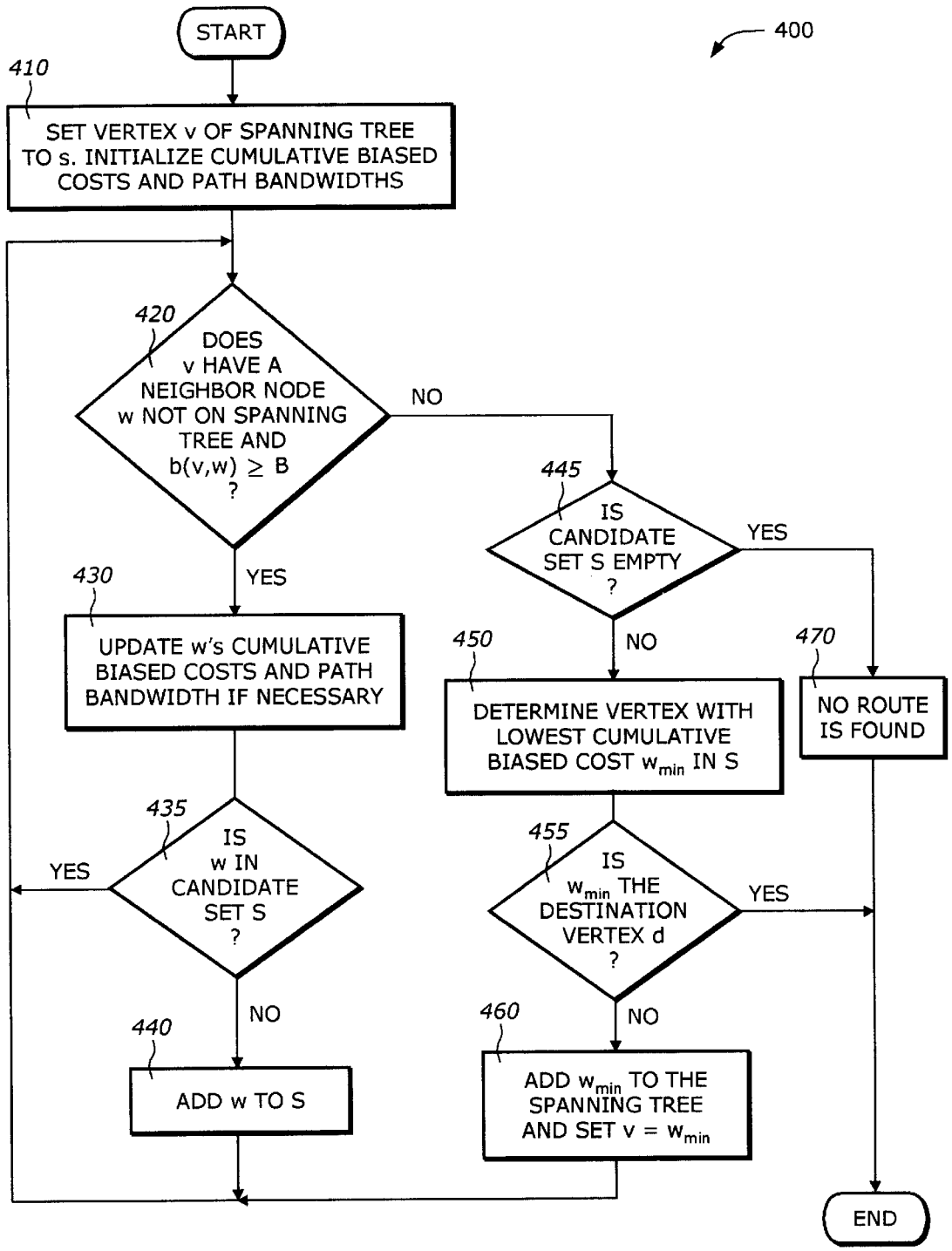
FIG. 4 is a flowchart illustrating a process to select route using biased cost according to one embodiment of the invention.

FIG. 4 is a flowchart illustrating a process 400 to select route using biased cost according to one embodiment of the invention.

Upon START, the process 400 sets the vertex of the spanning tree to s where s is the source node and initializes the set of vertices representing the spanning tree, the cumulative biased costs and the path bandwidths (Block 410). The initialization in Block 410 is explained in FIG. 5. Then the process 400 determines if v have a neighbor node w which is not on the spanning tree and its path bandwidth b(v,w) is greater than or equal to the bandwidth demand B (Block 420).

If v has such a neighbor w, the process 400 determines the cumulative biased cost and updates the cumulative based cost and path bandwidth if necessary (Block 430). The details of this block are discussed in FIG. 6. Then the process 400 determines if w is in the candidate set S (Block 435). If no, the process 400 adds w to the candidate set S (Block 440) and then return to Block 420; otherwise, the process 400 returns to block 420.

Once all neighbors of v have been examined, the process 400 determines if the candidate set S is empty (Block 445). If the candidate set S is empty, the process 400 determines that no route is found and inform the appropriate control (Block 470) and is then terminated. If the candidate set S is not empty, the process 400 determines the vertex in the candidate S with the lowest cumulative biased cost $w_{min}$ (Block 450). Then the process 400 determines if $w_{min}$ is the destination vertex d. If it is, the best route has been found and the process 400 is terminated. Otherwise, the process 400 adds $w_{min}$ to the spanning tree and set v=$w_{min}$ (Block 460). Next, the process 400 returns to Block 420.

Figure 5:
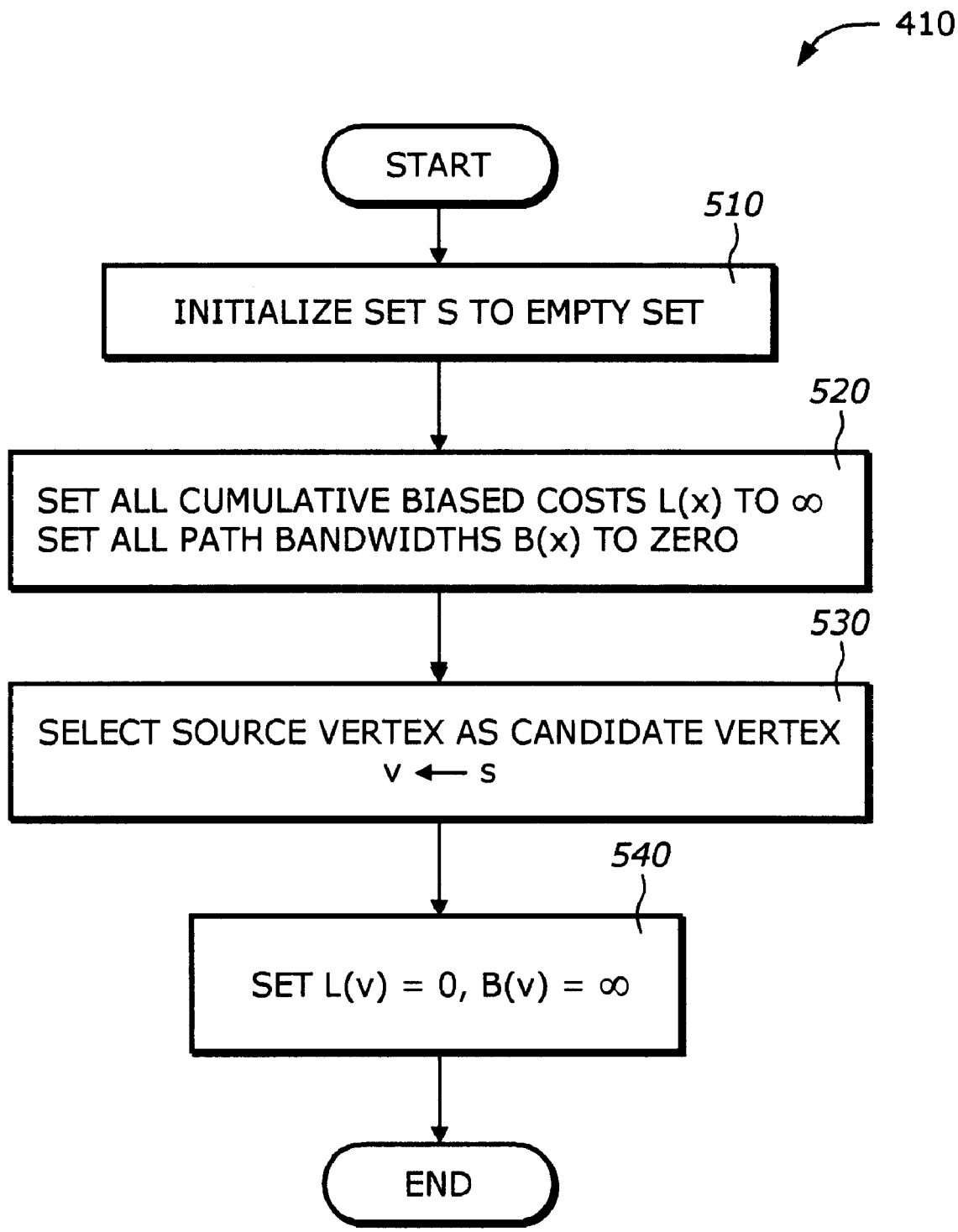
FIG. 5 is a flowchart illustrating a process to initialize the graph parameters according to one embodiment of the invention.

FIG. 5 is a flowchart illustrating a process 410 to initialize the graph parameters according to one embodiment of the invention.

Upon START, the process 410 initializes the set S to an empty set (Block 510). Then the process 410 sets all the cumulative biased costs L(x) to infinity and sets all the path bandwidths B(x) to zero (Block 520).

Then the process 410 selects the source vertex s as the first candidate vertex v (Block 530). Next, the process 410 sets the cumulative biased cost L(v) to zero and the path bandwidth B(v) to infinity (Block 540). Then the process 410 is terminated.

Figure 6:
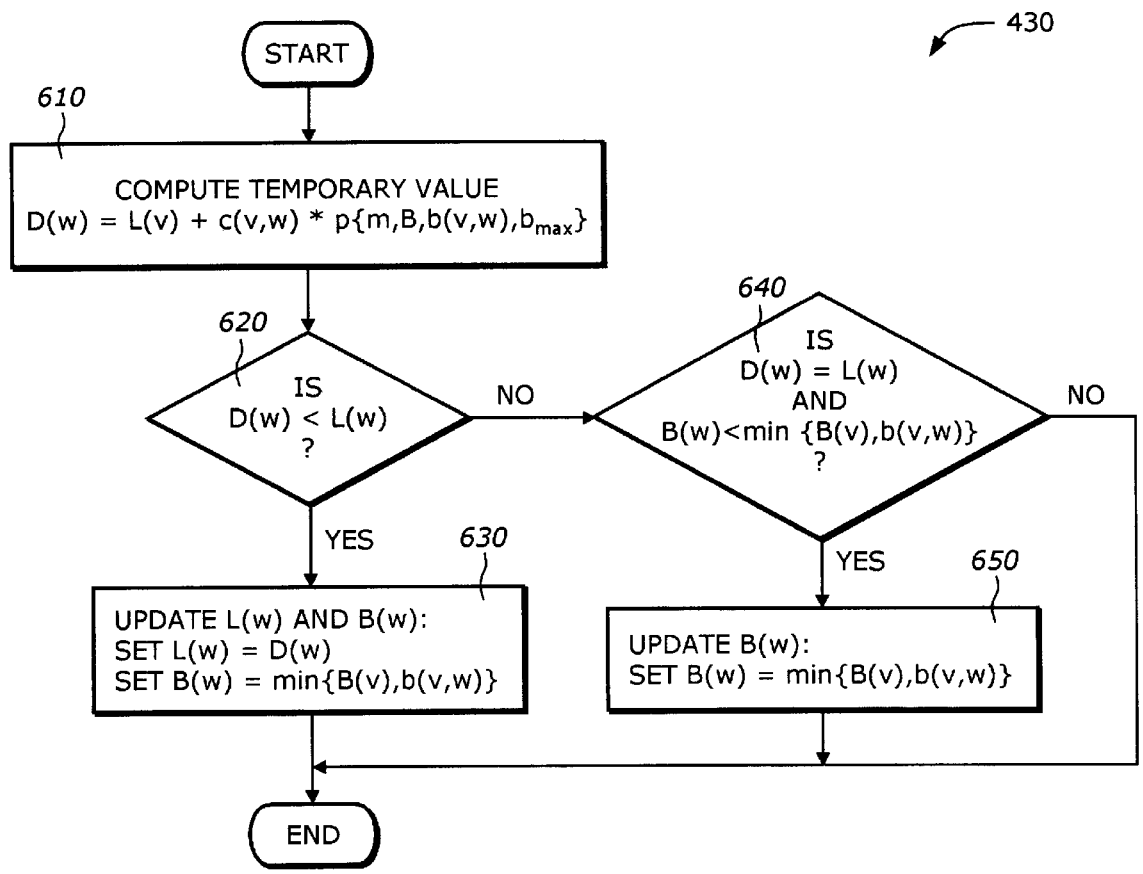
FIG. 6 is a flowchart illustrating a process to add candidate vertices according to one embodiment of the invention.

FIG. 6 is a flowchart illustrating a process 430 to update the cumulative biased cost according to one embodiment of the invention.

Upon START, the process 430 computes the temporary value $D(w)=L(v)+c(v,w)*p\{m,B,b(v,w),b_{max}\}$ (Block 610) where c(v,w) is the static cost of link (v,w) and $p(m,B,b(v,w),b_{max})$ is the biased cost function.

Then the process 430 determines if the cumulative cost D(w) is less than L(w) (Block 620). If not, the process 430 determines if D(w) is equal to L(w) and B(w) is less than min(B(v), b(v,w)) (Block 640). If no, no updating is necessary and the process 430 is terminated. If D(w) is equal to L(w) and B(w) is less than min(B(w), b(v,w)), the process 430 updates B(w) by setting B(w) to min{B(v), b(v,w)} (Block 650) and is then terminated.

If the cumulative cost D(w) is less than L(w), the process 430 updates L(w) and B(w) by setting L(w) to D(w) and B(w) to min{B(v), b(v,w)} (Block 630). Then the process 430 is terminated.

Incorporating Admission Control with Routing

In either the multi-class biased-cost route selection or the shortest-widest feasible path selection, a flow is routed so long as a feasible route exists. This may not always be desirable, as the cost in resource consumed (and hence future blocking) may exceed the gain in placing the flow. This phenomenon has been observed in circuit-switching networks in the past. In circuit-switching networks, trunk reservation provides an effective protection against the undesirable condition in which most circuits are routed along indirect paths. Trunk reservation can be viewed as a form of utilization-sensitive admission control: when the amount of bandwidth used by indirect circuits on a given link exceeds a threshold, no additional indirect circuits are allowed on the link.

When a route is selected by the shortest-widest feasible path algorithm, the cumulative path cost reflects the length of the route (and administrative weight of the links if cost≠1), but not the utilization. With the biased cost algorithm, a high cumulative cost can reflect high utilization, long route, or a combination of the two. The network can therefore elect to impose an admission control rule on each flow priority as follows:

Let r* be the least biased cost route found for a given flow (s, d, B, m). Reject the flow if $$\Sigma c(v,w)*p(m,B,b(v,w),b_{max})>T(m)$$

where T(m) is the admission threshold for flows of priority m.

In other words, T(m) reflects the benefit obtained by the network for routing a flow of priority m. The route selection algorithm should identify the route that maximizes the net benefit T(m)−cost if one exists, and reject the flow if the routing cost exceeds the benefit.

For example, by setting T(O)=∞ and T(m)<∞ for other m ∈ M, the network rejects lower-priority flows from routes with high-utilization links and/or long hops, which helps preserving the remaining capacity for use by highest-priority flows and reducing their rejection probability. We note that this is achieved at the expense of increased rejection probability for lower priorities. This is analogous to the effect of discarding schemes such as ATM Cell Loss Priority (CLP) threshold and Random Early Drop with In/Out bit (RIO) which preserve buffer resources for higher priority traffic at the expense of discarding lower priority traffic early.

Figure 7:
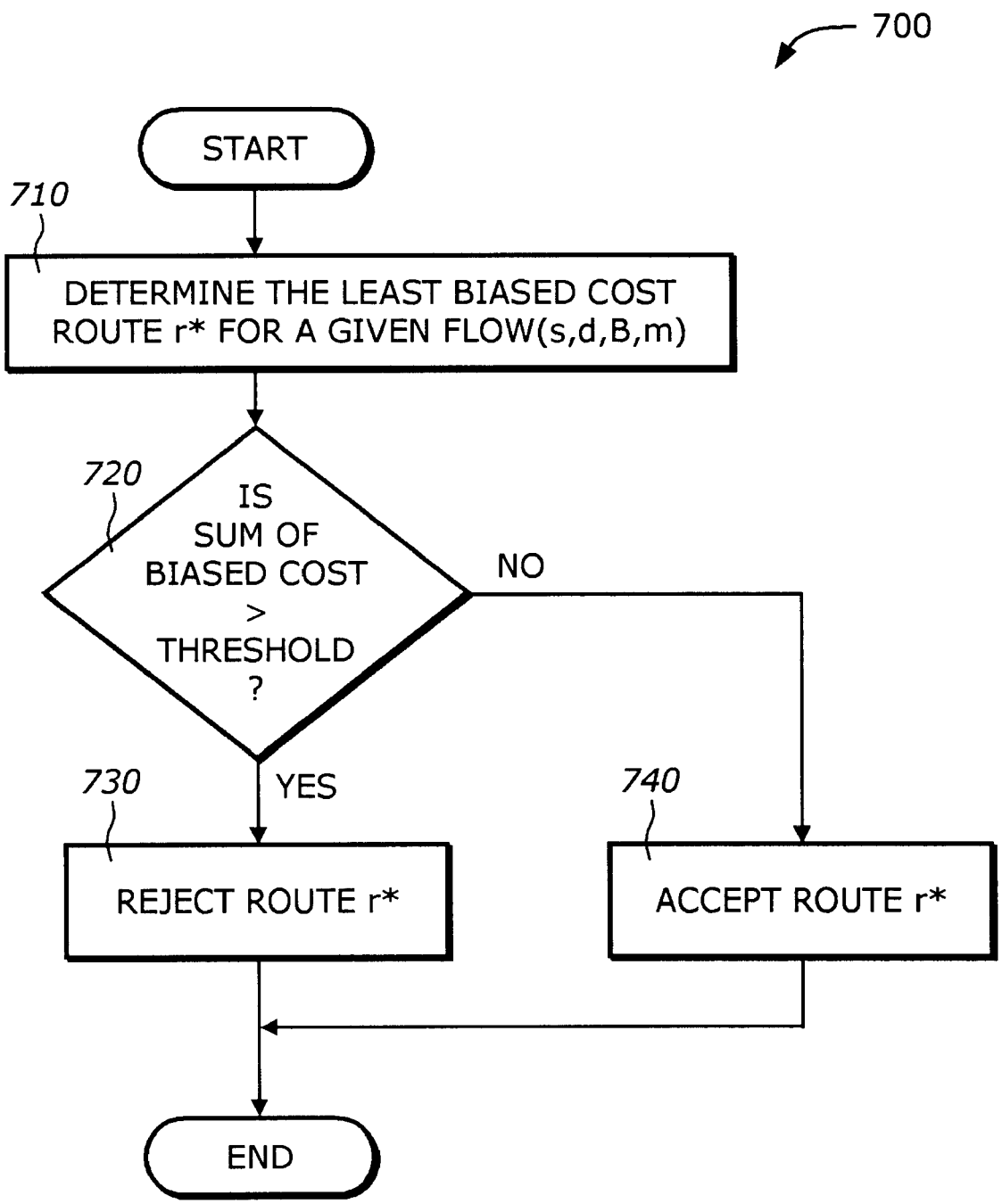
FIG. 7 is a flowchart illustrating a process to provide admission control according to one embodiment of the invention.

FIG. 7 is a flowchart illustrating a process 700 to provide admission control according to one embodiment of the invention.

Upon START, the process 700 determines the least biased cost route r* for a given flow (s, d, B, m) (Block 710). This is carried out as illustrated in FIG. 4. Then the process 700 determines if the sum of the biased cost for the priority m is greater than the admission threshold (Block 720). If no, the process 700 accept the route r*(Block 740) and is then terminated. If yes, the process 700 rejects the route r*(Block 730) and perhaps attempts to find another route. Then the process 700 is terminated.

Inter-Area Routing

OSPF introduces the concept of area to improve Autonomous System (AS) scalability through topology hierarchy. In this section, we consider extending the multi-class algorithm with cost bias to inter-area routing scenarios. The biased cost route selector follows the approach in which the area border routers (ABRs) calculate the available path bandwidths to networks external to an area and advertise them in the summary LSAs (or some new Opaque LSAs).

Thus for each such network, a router internal to the area only knows (1) the cumulative cost from an ABR to that network and (2) the path bandwidth from the ABR to that network. If there are multiple feasible paths through different ABRs available, a router internal to the area should select the route based on a combination of these two parameters and the available paths to those ABRs. The exact paths outside of the area are hidden by the topology hierarchy. The resulting explicit route, therefore, would include a strictly routed portion to the selected area border router and a loosely routed portion from the area border router to the destination.

A "shortest-widest feasible path" objective can be met for inter-area route selection as follows:

1. Consider all ABRs with sufficient bandwidth to the destination.

2. Find a shortest-widest feasible path within the area to each such ABR. An ABR is considered eligible if a feasible path exists.

3. If there are multiple eligible ABRs, select the one for which the sum of the cumulative cost from the source to the ABR and the path cost from that ABR to the destination is minimum. In the event of equal cost paths, use the overall path bandwidth from source to destination as a tie-breaker.

Cost bias can be incorporated in this framework in one of two ways: an optimistic method and a conservative method.

In the first, or optimistic, approach, the route selection find the feasible intra-area path with the minimum biased cost to each ABR in Step 2 above, using the bias function defined earlier. In Step 3, the ABR selection is made based on the sum of the biased cost for the intra-area segment and the static cost for the inter-area segment. In other words, no bias is applied to the inter-area segment.

Figure 8A:
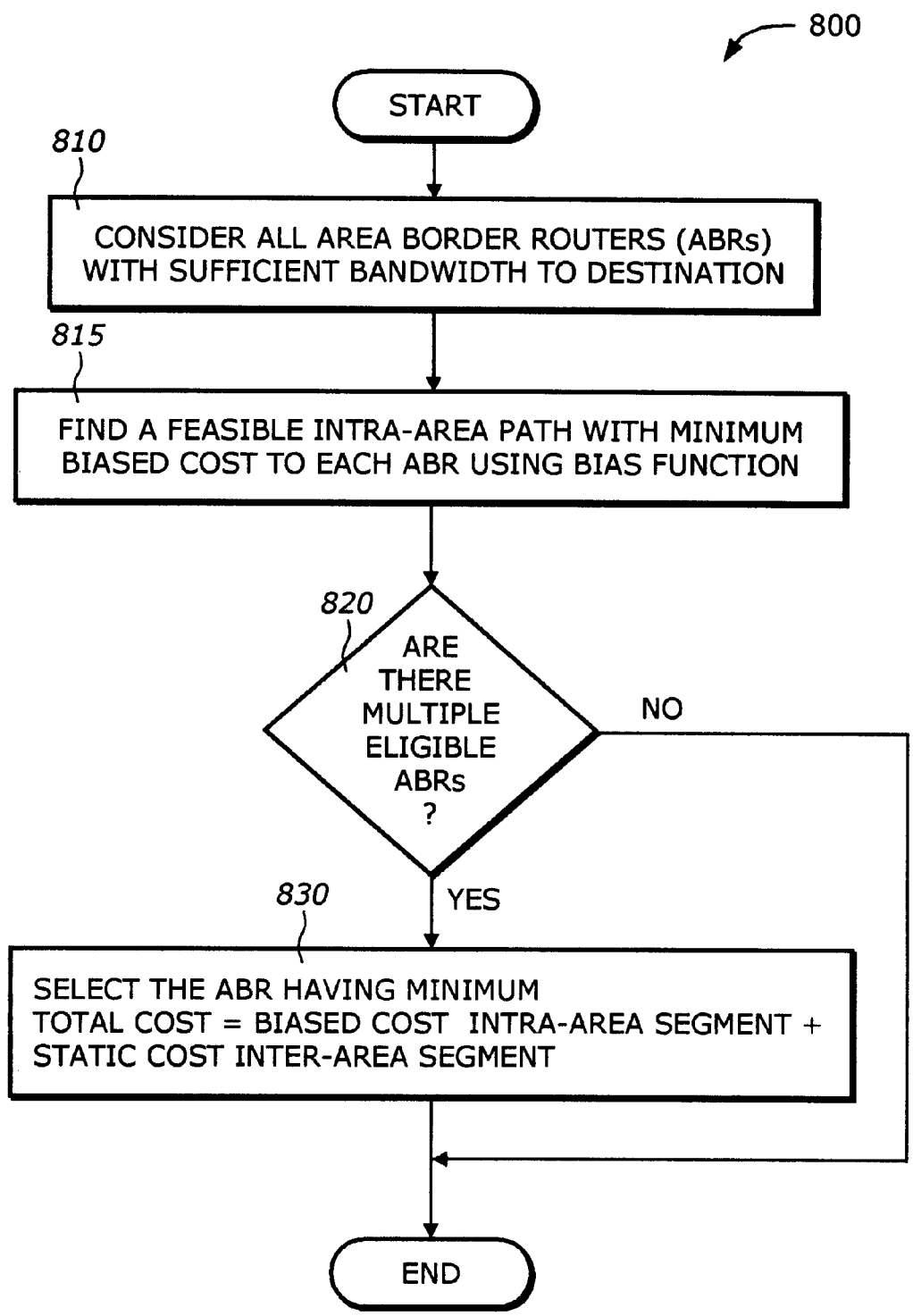
FIG. 8A is a flowchart illustrating a process for optimistic inter-area routing according to one embodiment of the invention.

FIG. 8A is a flowchart illustrating a process 800 for optimistic inter-area routing according to one embodiment of the invention.

Upon START, the process 800 considers all area border routers (ABRs) with sufficient bandwidth to destination (Block 810). Then the process 800 finds a feasible intra-area path with minimum biased cost to each ABR using the bias function as illustrated above (Block 815). Then the process 800 determines if there are any multiple eligible ABRs (Block 820). If no, the process 800 is terminated. If yes, the process 800 selects the ABR having the minimum total cost (Block 830). The total cost is the sum of the biased cost for intra-area segment and the static cost for the inter-area segment. Then the process 800 is terminated.

In the second, or conservative, approach, the route selection determines a cost bias for each ABR based on its available path bandwidth to the destination, using the same formula as link cost bias. This bias is then multiplied with the path cost from the ABR to that destination, and the route selection is based on the sum of the cumulative biased cost from the source to the ABR and the biased path cost from that ABR to the destination. This approach is conservative because it simply assumes that every link between the ABR and the destination has the same bottleneck bandwidth, which is why the same bias value can be applied to the entire inter-area segment.

Figure 8B:
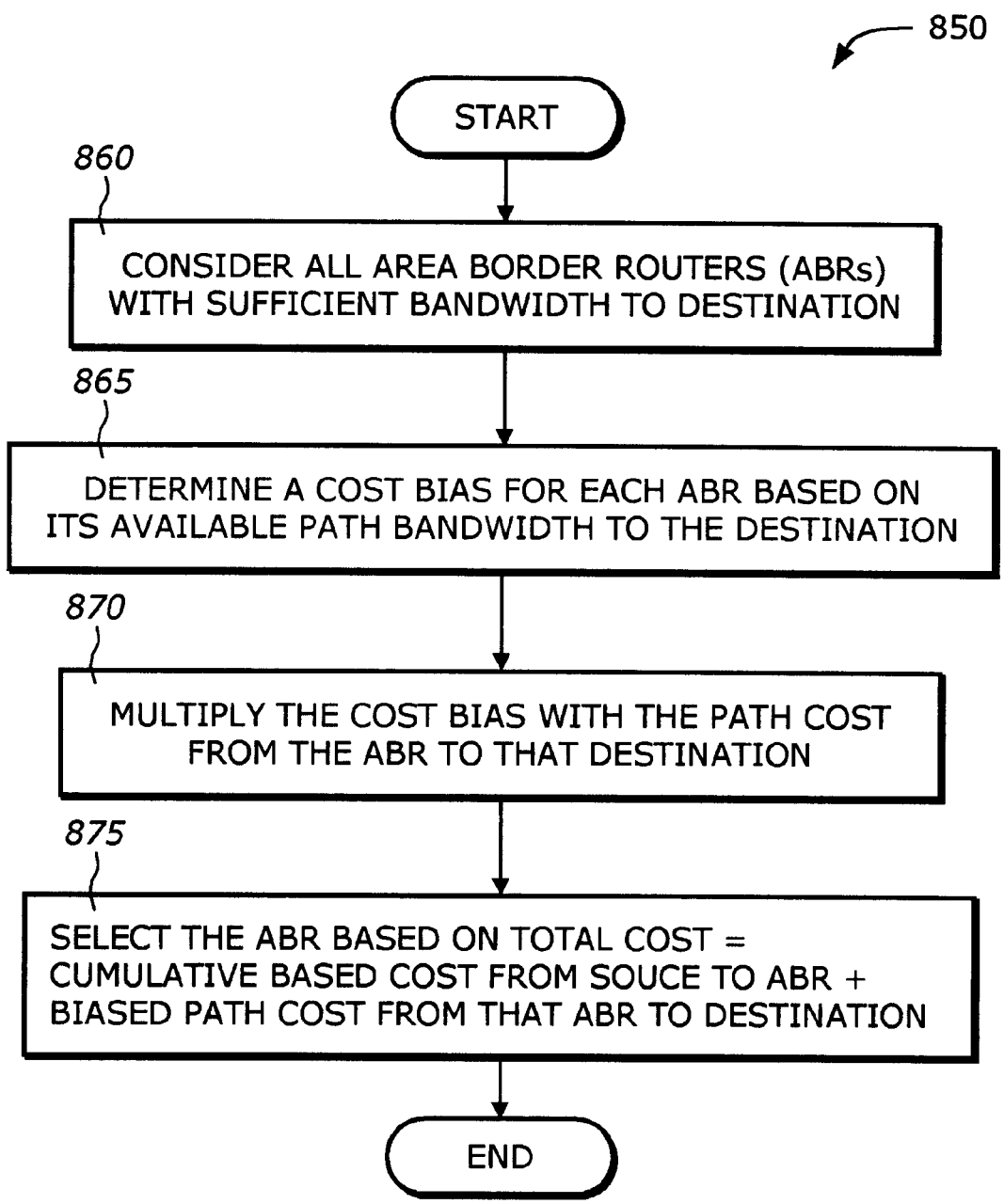
FIG. 8B is a flowchart illustrating a process for conservative inter-area routing according to one embodiment of the invention.

FIG. 8B is a flowchart illustrating a process 850 for conservative inter-area routing according to one embodiment of the invention.

Upon START, the process 850 considers all area border routers (ABRs) with sufficient bandwidth to destination (Block 860). Then, the process 850 determines a cost bias for each ABR based on its available path bandwidth to the destination (Block 865). Then the process 850 multiplies the cost bias with the path cost from the ABR to that destination (Block 870). Next, the process 850 selects the ABR based on the total cost (Block 875). The total cost is the sum of the cumulative biased cost from the source to the ABR and the biased path cost from that ABR to the destination. Then, the process 850 is terminated.

In either solution, some optimization potential is lost due to the detail-hiding property of topology hierarchy. These are the necessary tradeoffs to achieve scalability. Furthermore, the partition into intra- and inter-area segments means that not all potential source-destination routes are considered. An ABR R1 may advertise a path bandwidth to destination X, and be considered ineligible for a given flow. However, on a longer alternative path, the available path bandwidth from R1 to X may be higher. If route selection is made with complete link state knowledge, it may determine that an end-to-end path through R1 over the longer inter-area segment to X is indeed the optimal.

This provides one motivation for a centralized route selection server that monitors and maintains global link state information for the entire Autonomous System (AS), and generates explicit routes for individual ingress LERs.

Centralized Route Selection Server Paradigm

A centralized route selection server is a device that maintains a topology database of the entire AS and dynamically updates it by passively monitoring LSAs in all areas. This device may contain a library of route selection algorithms that cater to different objectives (e.g., bandwidth/cost, priority/cost, delay/cost, diversity, load balancing). For each given CR-LSP, the route selection server may consult the network policy repertoire for the suitable objective and select the algorithm to run. This route selection server may work as an advisory tool for network operators in traffic placement, or, in an automated environment, generate contents of CR-LSP TLVs and forward them to the source LERs.

A centralized server can help select inter-area paths that are optimized for an AS. We should also note that since the server has the complete topological information, the explicit route can be requested with all intermediate nodes specified, instead of loosely routed for the segment external to the area of the source LER. Furthermore, since the centralized server has the complete bandwidth availability information within an AS, for the multi-class technique it can apply the correct cost bias for each link between the source and the destination. This avoids the use of approximations for links outside of the source LER's.

In addition, certain optimizations to the multi-class technique may not be viable in a distributed implementation and only suitable in a centralized server paradigm. One such case is parameter optimization. The proposed cost bias functions contain one or more parameters associated with the priority classes.

Parameter optimization is useful when the network topology and offered traffic have stationary or slow-varying characteristics, such that there is a set of parameters optimizing the routing policy's reward. If the network and offered load are time-varying, as may be expected in practical networks, the benefit of training and tuning the parameters may not warrant the computational overhead.

A centralized server paradigm is also more suitable to support multiple route selection algorithms that are policy-driven. Unlike a distributed implementation, introducing a new algorithm or a modification to reflect a policy change does not require software upgrade on all LERs.

COST BIAS FUNCTION

Desirable Properties of the Cost Bias Function

The cost bias function $p(m, B, b(v,w), b_{max})$ biases the static cost of link $(v, w)$ to reflect its bandwidth availability, such that the selected path has the minimum cumulative biased cost from s to d. In the event of multi-paths with equal biased cost, the path bandwidth serves as a tie-breaker as before. Furthermore, flows with different priorities are subject to different degrees of bias to reflect their sensitivities toward congested links. The cost bias function $p(m, B, b(v,w), b_{max})$ should have the following properties:

1. $p(m, B, b(v,w), b_{max}) < p(n, B, b(v,w), b_{max})$ for m<n where m and n ∈ M The cost to place a given bandwidth B on a given link with $b(v, w)$ should be higher for lower priority (higher numerical value) flows.

2. $dp(m, B, b(v,w), b_{max})/db(v,w) < 0$. That is, the larger is the available capacity, the less the cost bias.

3. $dp(m, B, b(v,w), b_{max})/dB > 0$. That is, the larger is the bandwidth demand, the higher the cost bias.

4. $dp(m, B, b(v,w), b_{max})/db(v,w) > dp(n, B, b(v,w), b_{max})/db(v,w)$ and $dp(m, B, b(v,w), b_{max})/dB < dp(n, B, b(v,w), b_{max})/dB$ for m<n where m and n ∈ M. Since n is a lower priority, it should have a steeper cost bias curve. In other words, lower priority flows should be more sensitive toward a congested link.

5. $1 \leq p(m, B, b(v,w), b_{max}) < \infty$ for m ∈M, $0 \leq B \leq b_{max}$, and $0 \leq b(v,w) \leq b_{max}$. The lower bound is not necessary, but is desirable so that the biased cost is always greater than or equal to the static cost.

Special Cases:

Furthermore, based on these properties of the cost bias function, when the parameters are reduced to a number of special cases, the biased cost route selector should have the following characteristics:

Single priority class: The biased cost route selector is also applicable in classless routing. In this case, $p(m, B, b(v,w), b_{max})$ is reduced to $p(B, b(v, w), b_{max})$. The resulting route selection algorithm is one that biases against choosing highly congested links and loads traffic among multiple paths between a source-destination pair by trading off hop count with link congestion.

Equal-loading links: When $b(v,w)=b_{max}$ for all $(v,w) \in E$, the technique should select the same path as the shortest-widest feasible path technique. This is because with any given pair of m and B, all links are biased equally by a constant p(m, B), i.e., p(m, B, b(v,w), $b_{max}$)=p(m,B). Thus $\Sigma c(v,w)*p(m, B, b(v,w), b_{max})=p(m,B)*\Sigma c(v,w)$ for all (v,w) belonging to r and r belonging to R.

Only the cumulative static costs affect the route selection and the multi-class algorithm behaves the same as the shortest-widest feasible path.

Extending this further, if all links have the same physical bandwidth and the link utilization within the network remains uniform, the routing behaviors of the two methods should remain close. However, when the traffic loading to the network is biased toward certain sets of source-destination pairs, which arises in most practical scenarios, the multi-class technique attempts to offer a greater diversification on the multi-paths.

Cost Bias Functions

A normalized link availability $\beta(v,w)$ is used in the cost bias functions considered below, where $\beta(v,w)=(b(v,w)-B)/b_{max}$. This corresponds to the state of the link (v, w) after the flow with bandwidth B is placed there. Note that for all eligible links, $0 \leq \beta(v,w) < 1$. This simplifies the bias function notation from $p(m, B, b(v,w), b_{max})$ to $p(m, \beta(vw))$. Thus $c(v,w)*p(m, \beta(v,w))$ is the biased cost to place a flow of priority m on link (v, w), leading to subsequent normalized availability $\beta(v,w)$.

Three families of cost bias functions that satisfy the desirable properties above are:

Exponential: $p(m,\beta(v,w))=\exp\{a_m (1-\beta(v,w))\}$, where $1 \leq a_m < a_n$ for m<n, m and n $\in$ M.

Linear combination: $p(m,\beta(v,w))=\alpha_1 \beta(v,w)^{-2a_{m,1}}+\alpha_2 \beta(v,w)^{-a_{m,2}}$, where $0 \leq a_m < a_n$ for m<n, m and n $\in$ M.$\beta_1>0$, $\alpha_2>0$.

Logarithmic: $p(m,\beta(v,w))=(\log(\beta(v,w)+1)^{-a_m}$, where $0 \leq a_m < a_n$ for m<n, m and n $\in$ M.

Figure 9A:
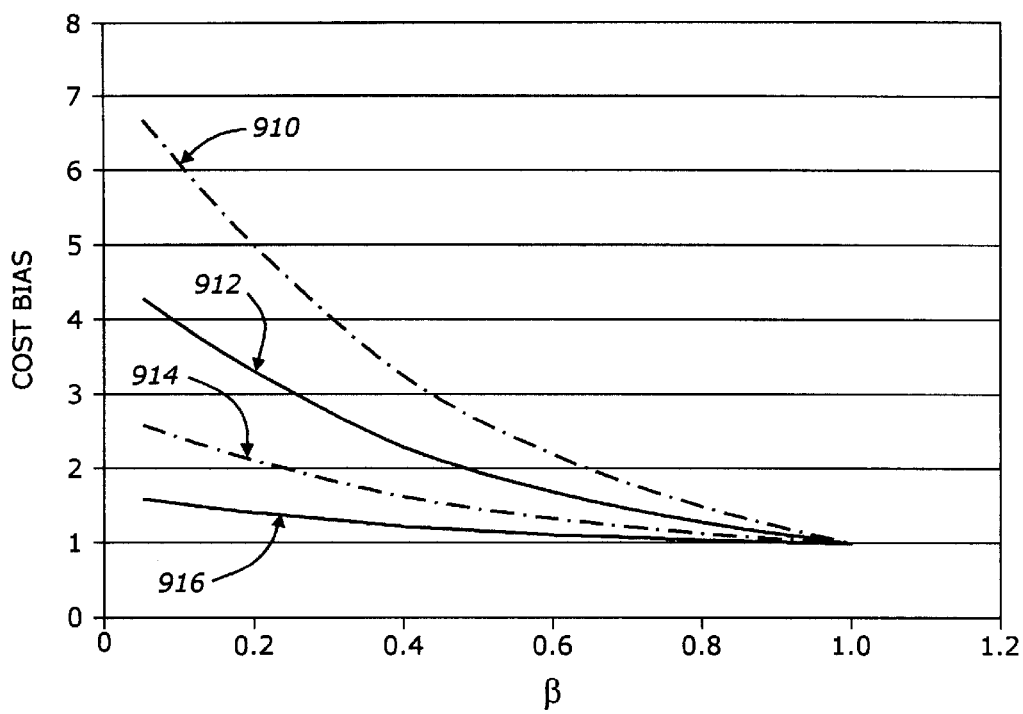
FIG. 9A is a diagram illustrating an exponential cost bias function according to one embodiment of the invention.

FIG. 9A is a diagram illustrating an exponential cost bias function according to one embodiment of the invention.

There are four curves 910, 912, 914, and 916 corresponding to four classes of flows. The curves 910, 912, 914, and 916 have the parameter values $a_0=0.5$, $a_1=1$, $a_2=1.5$, and $a_3=2$, respectively.

Figure 9B:
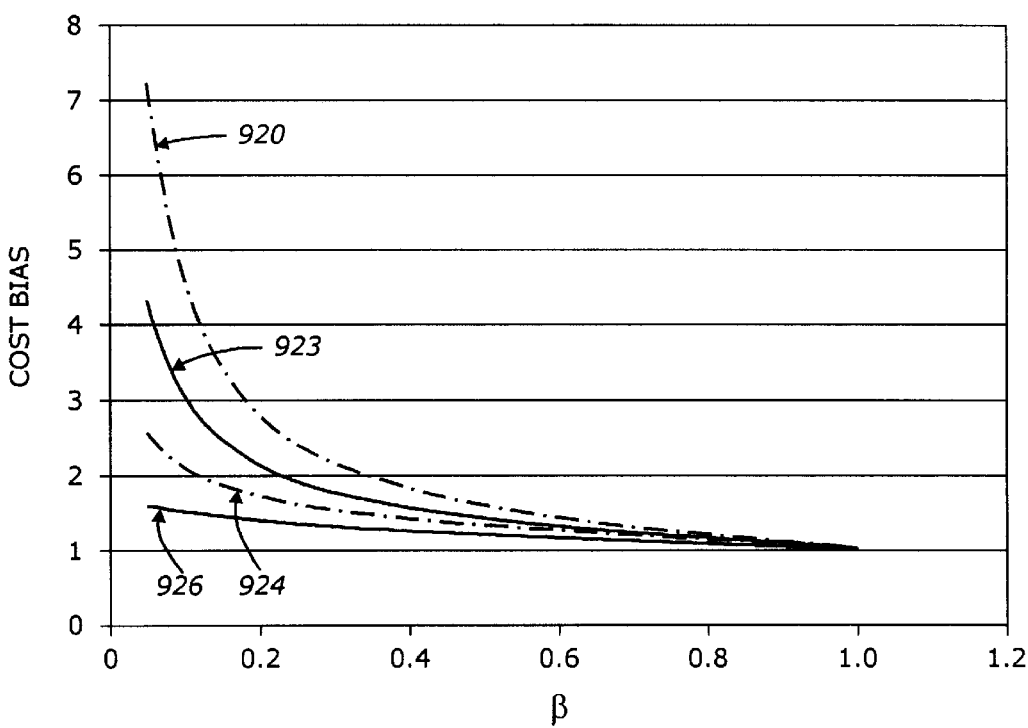
FIG. 9B is a diagram illustrating a linear combination cost bias function according to one embodiment of the invention.

FIG. 9B is a diagram illustrating a linear combination cost bias function according to one embodiment of the invention.

There are four curves 920, 922, 924, and 926 corresponding to four classes of flows. These four curves all have $\alpha_1=\alpha_2=0.5$. The parameters for the $a_{m,1}$ and $a_{m,2}$ of the curves 920, 922, 924, and 926 are $(a_{0,1}=a_{0,2}=0.1)$, $(a_{1,1}=a_{1,2}=0.2)$, $(a_{2,1}=a_{2,2}=0.3)$, and $(a_{3,1}=a_{3,2}=0.4)$, respectively.

Figure 9C:
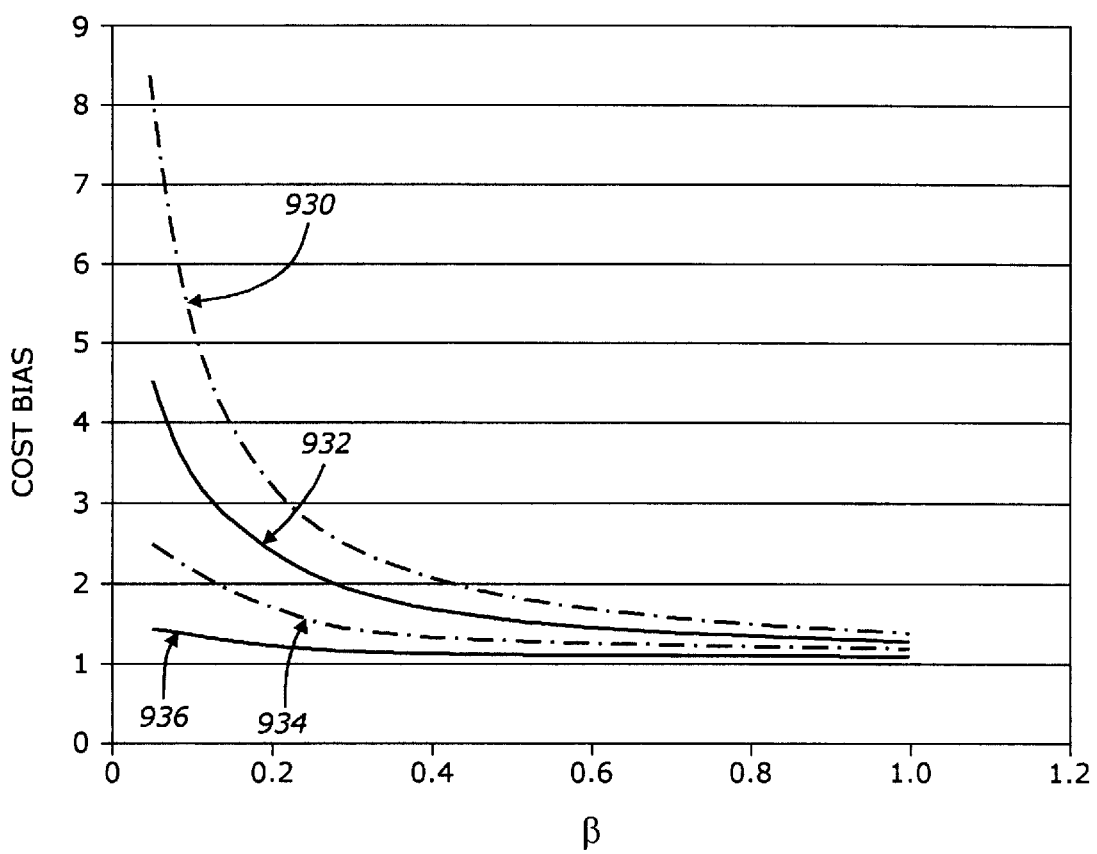
FIG. 9C is a diagram illustrating a logarithmic cost bias function according to one embodiment of the invention.

FIG. 9C is a diagram illustrating a logarithmic cost bias function according to one embodiment of the invention.

There are four curves 930, 932, 934, and 936 corresponding to four classes of flows. The curves 930, 932, 934, and 936 have the parameter values $a_0=0.5$, $a_1=1$, $a_2=1.5$, and $a_3=2$, respectively.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to select a route for a flow from a plurality of network paths, comprising:

determining cumulative costs for a plurality of candidate paths from the network paths using a cost bias, the cost bias being dynamically calculated based on at least one of a flow attribute characterizing the flow and a path attribute; and selecting an optimal path having a minimum of the cumulative costs, the optimal path corresponding to the route.

2. The method of claim 1 wherein the flow attribute includes a flow priority and a bandwidth demand.

3. The method of claim 2 wherein the path attribute includes a link bandwidth and a maximum available link bandwidth.

4. The method of claim 3 further comprising:

determining a path bandwidth associated with each of the candidate paths.

5. The method of claim 3 wherein determining the cumulative costs comprises:

selecting a candidate node for a current node in each of the candidate paths not previously included in the corresponding candidate path, the candidate node and the current node being connected in a link having the link bandwidth satisfying the bandwidth demand, the candidate node having a candidate biased cumulative cost less than a previous biased cumulative cost.

6. The method of claim 4 wherein selecting the optimal path comprises:

if there are more than one minimum of the cumulative costs, selecting the optimal path having the minimum of the cumulative costs and a maximum path bandwidth.

7. The method of claim 6 wherein the candidate biased cumulative cost includes a current cumulative cost and a biased static cost, the biased static cost including a static cost of the link biased by a bias value.

8. The method of claim 7 wherein the bias value is a function of the flow priority, the bandwidth demand, the link bandwidth, and the maximum available link bandwidth.

9. The method of claim 7 wherein a decrease in flow priority increases the bias value.

10. The method of claim 7 wherein an increase in link bandwidth decreases the bias value.

11. The method of claim 7 wherein an increase in bandwidth demand increases the bias value.

12. The method of claim 7 wherein the bias value is greater than or equal to 1.

13. The method of claim 6 further comprising:

rejecting the selected optimal path if the minimum of the cumulative costs exceeds an admission threshold.

14. The method of claim 6 wherein the plurality of network paths include an intra-area segment and an inter-area segment.

15. The method of claim 14 wherein the cumulative costs in the inter-area segment exclude the cost bias.

16. The method of claim 14 wherein the inter-area segment has the same cost bias for the candidate paths.

17. A computer program product comprising:

a computer usable medium having computer program code embodied therein to select a route for a flow from a plurality of network paths, the computer program product having:

computer readable program code for determining cumulative costs for a plurality of candidate paths from the network paths using a cost bias, the cost bias being dynamically calculated based on at least one of a flow attribute characterizing the flow and a path attribute; and computer readable program code for selecting an optimal path having a minimum of the cumulative costs, the optimal path corresponding to the selected route.

18. The computer program product of claim 17 wherein the flow attribute includes a flow priority and a bandwidth demand.

19. The computer program product of claim 17 the path attribute includes a link bandwidth and a maximum available link bandwidth.

20. The computer program product of claim 19 further comprising:

computer readable program code for determining a path bandwidth associated with each of the candidate paths.

21. The computer program product of claim 17 wherein the computer readable program code for determining the cumulative costs comprises:

computer readable program code for selecting a candidate node for a current node in each of the candidate paths not previously included in the corresponding candidate path, the candidate node and the current node being connected in a link having the link bandwidth satisfying the bandwidth demand, the candidate node having a candidate biased cumulative cost less than a previous biased cumulative cost.

22. The computer program product of claim 20 wherein the computer readable program code for selecting the optimal path comprises:

computer readable program code for selecting the optimal path having the minimum of the cumulative costs and a maximum path bandwidth if there are more than one minimum of the cumulative costs.

23. The computer program product of claim 22 wherein the candidate biased cumulative cost includes a current cumulative cost and a biased static cost, the biased static cost including a static cost of the link biased by a bias value.

24. The computer program product of claim 23 wherein the bias value is a function of the flow priority, the bandwidth demand, the link bandwidth, and the maximum available link bandwidth.

25. The computer program product of claim 23 wherein a decrease in flow priority increases the bias value.

26. The computer program product of claim 23 wherein an increase in link bandwidth decreases the bias value.

27. The computer program product of claim 23 wherein an increase in bandwidth demand increases the bias value.

28. The computer program product of claim 23 wherein the bias value is greater than or equal to 1.

29. The computer program product of claim 22 further comprising:

rejecting the selected optimal path if the minimum of the cumulative costs exceeds an admission threshold.

30. The computer program product of claim 22 wherein the plurality of network paths include an intra-area segment and an inter-area segment.

31. The computer program product of claim 30 wherein the cumulative costs in the inter-area segment exclude the cost bias.

32. The computer program product of claim 31 wherein the inter-area segment has the same cost bias for the candidate paths.

33. A system comprising:

a processor; and a memory coupled to the processor, the memory containing program code to select a route for a flow from a plurality of network paths, the program code when executed causing the processor to determine cumulative costs for the network paths using a cost bias, the cost bias being dynamically calculated based on at least one of a flow attribute characterizing the flow and a path attribute, and select an optimal path having a minimum of the cumulative costs, the optimal path corresponding to the route.

34. The system of claim 33 wherein the flow attribute includes a flow priority and a bandwidth demand.

35. The system of claim 33 wherein the path attribute includes a link bandwidth and a maximum available link bandwidth.

36. The system of claim 33 wherein the program code further causing the processor to determine a path bandwidth associated with each of the candidate paths.

37. The system of claim 33 wherein the program code determining the cumulative costs causes the processor to select a candidate node for a current node in each of the candidate paths not previously included in the corresponding candidate path, the candidate node and the current node being connected in a link having the link bandwidth satisfying the bandwidth demand, the candidate node having a candidate biased cumulative cost less than a previous biased cumulative cost.

38. The system of claim 37 wherein the program code selecting the optimal path causes the processor to:

select the optimal path having the minimum of the cumulative costs and a maximum path bandwidth if there are more than one minimum of the cumulative costs.

39. The system of claim 38 wherein the candidate biased cumulative cost includes a current cumulative cost and a biased static cost, the biased static cost including a static cost of the link biased by a bias value.

40. The system of claim 39 wherein the bias value is a function of the flow priority, the bandwidth constraint, the link bandwidth, and the maximum available link bandwidth.

41. The system of claim 39 wherein a decrease in flow priority increases the bias value.

42. The system of claim 39 wherein an increase in link bandwidth decreases the bias value.

43. The system of claim 39 wherein an increase in bandwidth demand increases the bias value.

44. The system of claim 39 wherein the bias value is greater than or equal to 1.

45. The system of claim 38 wherein the program code further causing the processor to reject the selected optimal path if the minimum of the cumulative costs exceeds an admission threshold.

46. The system of claim 38 wherein the plurality of network paths include an intra-area segment and an inter-area segment.

47. The system of claim 46 wherein the cumulative costs in the inter-area segment exclude the cost bias.

48. The system of claim 46 wherein the inter-area segment has the same cost bias for the candidate paths.

* * * * *